Aug. 30, 1960
D. RUBENSTEIN
2,951,006
REEL-UNIT AND METHOD
Filed Jan. 16, 1953
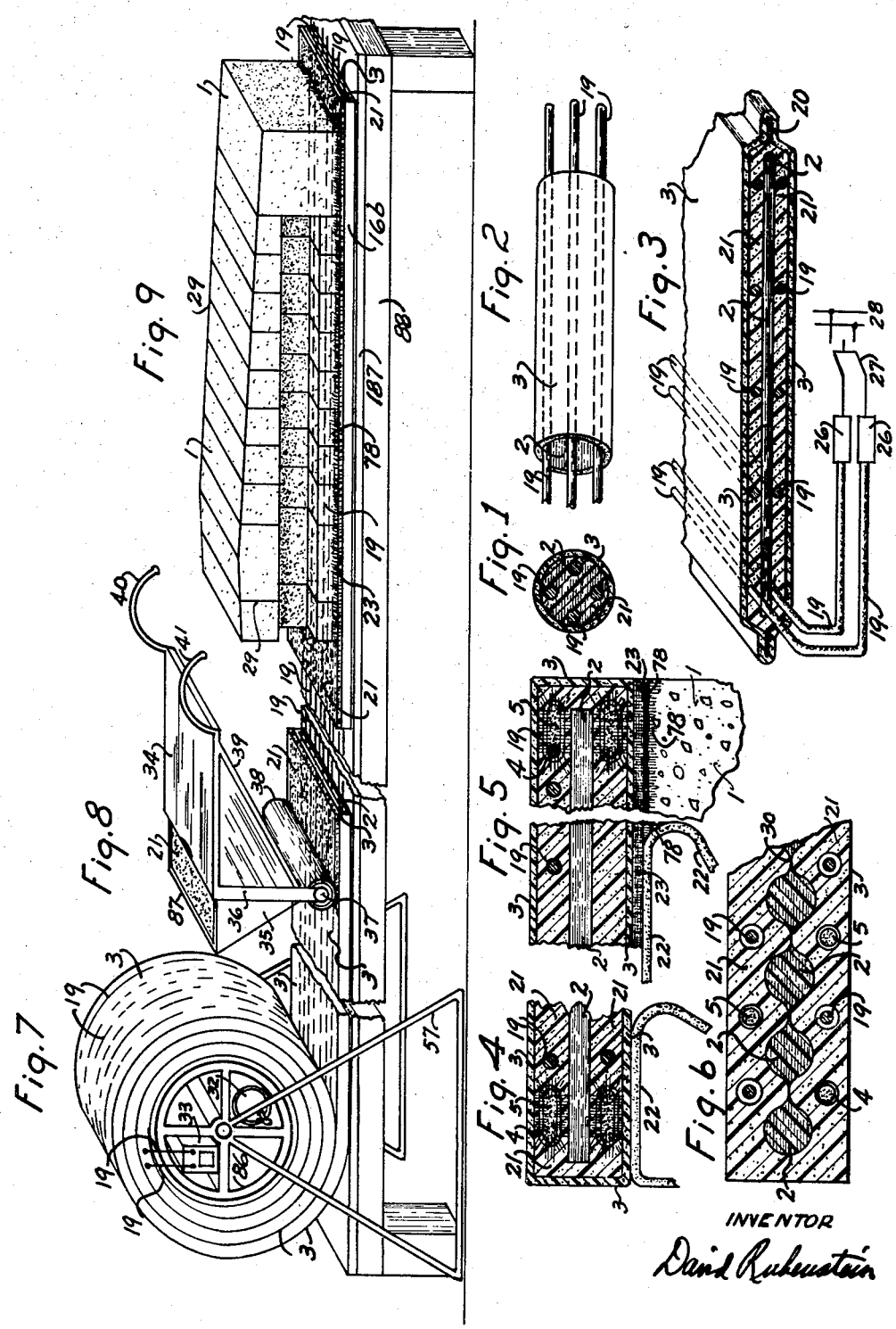
INVENTOR
David Rubenstein

United States Patent Office 2,951,006
Patented Aug. 30, 1960

2,951,006

REEL-UNIT AND METHOD

David Rubenstein, 2750 Second Ave., San Diego, Calif.

Filed Jan. 16, 1953, Ser. No. 340,642

20 Claims. (Cl. 154—126)

This invention relates to building structures of concrete and the like and more particularly to plastic-covered structures in, or for use in, buildings, bridges, pipe lines, military installations, and in general wherever stone or stonelike structures have been used, e.g., brick, tile, concrete, plaster, etc., in form of blocks, tubes, slabs, framing members for monolithic structures; and to methods and apparatus for making and using the same.

This invention particularly relates to reel-units for packaging, transporting and processing envelope constructions containing reinforcing materials adapted to provide loadbearing and decorative-structural reinforcement to porous structural bodies and methods for use of said reel-units and packaged materials thereof. This application is a continuation-in-part of Serial No. 267,166 filed December 17, 1951, now Patent No. 2,671,158.

One object of this invention is to provide rapidly placed and immediately useful reinforcing incorporated into and upon concrete bodies.

A further object of the present invention is to achieve the mass production of elements useful in the reinforcing of concrete structures.

A further object of this invention is to provide compact, light weight layers of high strength reinforced concrete reinforcement ready for use in single or multiple layers and all of which bond and congeal into unitary structural reinforcement securely and permanently bonded and attached to concrete bodies.

A further object of this invention is to make stranded cable-like reinforcements at place of use, coming to said place of use in packaged assembly of necessary component materials or otherwise as compact package construction unit.

A further object is to make reel-units for packaging, transporting and processing envelope constructions containing reinforcing materials adapted to provide load-bearing reinforcement and used to make vessels and tanks by use of tubular and circular reinforcement assembly of discrete materials coming to the site of use in packaged form and by means of liquid pressure, atmospheric, air or vacuum pressure, gas pressure or mechanical pressure or any of these in combination or alone inflate these assemblies into desired shapes while in the process of being formed and while undergoing the thermosetting and curing of the plastic resin binders contained within the packages and the fixing of fiber glass or other fibrous reinforcements and the plastic resins into rigid laminated bodies bonded to and supported against and by precast concrete slabs and shapes.

A further object is to make reel-units adapted to provide packaged ready-for-use laminating materials with which to make vessels and tanks by means herein disclosed which vessels and tanks are self supporting, strong, lightweight and able to float on water as pontoons or floating objects and devices, and also to make structural load bearing components out of said cellular vessels.

A further object is to provide means and materials for lining vitreous clay or concrete or other porous type pipe lines and other similar porous concrete bodies or the like with plastic resin fiber reinforced laminations by use of liquid, air, mechanical or gas pressure or the like to connect plastic resin bonds to the concrete or other type porous materials.

A further object is to provide means and make reinforcing that is packaged in reels or spools or the like of long lengths and assorted widths that can be cut to desired lengths or shape and also provide means for curing on site, the laminated structures and constructions when placed in use and made from packaged components assembled and prepared for use as disclosed herein.

The reel-units made having laminations thereof can be assemblies which make composite members of great strength and durability. Also these laminations can be bonded one to the other as taken from the reel to form unitary structures and constructions giving high strength structures with normal static loading and yieldingly resistant with flexible and rubber-like absorption of high energy impacts imposed through or externally onto the structure. These constructions will be especially useful in that they will tend to maintain this quality of yielding resistance while maintaining the integrity of the structure from pressures and impact forces momentary and moving in character.

Other objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings:

Figure 1 is a cross-section of a transportable packaged reinforcement such as is a component of and processed from a reel-unit of my invention, Figure 2 is a longitudinal view of a portion of the component shown in Figure 1, Figure 3 is an isometric view showing a modified form of envelope construction of this invention as is packaged on a reel-unit of my invention, Figure 4 is a fragmentary sectional view showing a portion of a modified structure similar to that of Figure 3 but on an enlarged scale, Figure 5 is a sectional view like that of Figure 4, but broken with the left portion showing a cover sheet being stripped off and the right portions showing the bonding of the unit to the concrete or other porous structural body after it has been unreeled from the reel-unit, Figure 6 is a sectional view showing a further embodiment of the invention, Figure 7 is an isometric view of a reel-unit of my invention, Figure 8 is an isometric view of a device for applying the invention's enveloped construction and bonding resin provided on the reel-unit, Figure 9 is an isometric view of a portion of a concrete beam being assembled and combined with an enveloped reinforcement construction from the reel-unit components on a make-up table, showing method of bonding.

The reel-unit comprises several cooperative elements as shown in Figure 7 but not necessarily limited to this specific construction, there being variations of said constructions considered as included in the concept of this invention, e.g., said cooperative elements comprised of the reel upon which an envelope is wound, said envelope being provided with a core of heating elements, unpolymerized plastic resin, and fibrous reinforcement. The reel may have a battery therein or other means for providing heat energy or other means for aiding in the polymerization and cure of the plastic resin compositions of the enveloped packaged reinforcement. The envelope containing the fibrous reinforcement and/or other components is unrolled from the reel which may have the said battery therein or may be adapted to connection of the resistance heating elements contained in the envelope to another heat energy source, which battery or other source of heat energy is connected or is processed with heat, through an open circuit to the said heating elements, thereafter pressing and rupturing catalyst means which may be contained in said envelope or in cooperative envelope constructions packaged therewith, then closing the circuit between the battery or other source of heat energy, then with the aid of the heat therefrom provided in the enveloped construction with the now catalyzed plastic resin compositions, polymerizing the plastic resin compositions or composition into a rigid state, or that state of rubbery semi-rigid state compatible with the characteristics of the plastic resin composition then being used about the said fibrous reinforcement and as a layer on the surfaces and in the pores of the structural material to which the enveloped materials and the bonding materials of the reel-unit are applied.

Referring to the drawings, the strands used in this case, to reinforce the plastic are designated 2 and the same comprises a plurality of strands, each covered with a plastic resin or resins 21.

Any desired number of strands 2, depending on the required cross sectional area of reinforcement required are laid together in non-abrasive relationship and impregnated and coated with plastic resin 21. Polymerization catalyst 5 acts by contact and diffusion through the resin when the temperature is sufficiently raised. The strands 2 may be unidirectional strands, multi-directional strands, fiber mats, unidirectional fabrics and multi-directional fabrics, in combination or either of them, as required to produce the necessary cross sectional area of reinforcement to carry the required designed loads. The strands are advantageously orientated in the direction of the greatest required tensile strength of the laminated construction. Compressive strengths, shear strengths, and torsion strengths are designed for by orientation and placement of fibers along the directions of applied loads; the strength of the plastic is thus supported and augmented by the strength of such strands.

The factory process prepares correct proportions of reinforcement strands, plastic resins, catalysts, fillers, colors, adhesives and packages the product for use as a transportable unit completely ready for placement and use at the site.

These strands 2 may be of sisal, hemp, burlap, cotton, wool, fibers, Fiberglas, fuzed quartz or the like. It is preferred where high strength values are needed to use Fiberglas in its various forms of strands, mats, roving, cords, strings, cables and fabrics, as Fiberglas is good for 300,000 p.s.i. ultimate in tension calculated on actual cross section of the fibers.

The envelope 3 and plastic used is preferably flexible, but also can be rigid in suitable lengths that are cut to convenient lengths or kept in long lengths folded at intervals for easy packaging and handling. The envelope 3 can be made out of cellophane, cellulose acetate, cellulose acetate butyrate, cellulose nitrate, ethyl cellulose, polyvinyl chloride, vinyl chloride-acetate copolymer, polyvinylidenechloride (Saran), vinyl chloride-vinylidene chloride copolymers, polyvinyl alcohol, polyethylene, polytetrafluoroethylene, polystyrene, polyamide (nylon), rubber hydrochloride, rubber vinyl, used alone or in compatible combination but not limited to items of envelope material given herein or combinations thereof, such items used or the like used alone or in combination with bonding resins, one of which could be an unsaturated polyester resin and benzoyl peroxide catalyst or the like or other catalytic means with added styrene or the like for viscosity control and materials known in the art of plastic compounding as inhibitors.

Such flexible or partly flexible or rigid envelopes with their contained resins may be stored and kept in stock for ready use for reasonable periods of time without deterioration. Further, envelopes either flexible or rigid containing separate portions for later combination and mixing may be packaged alone or together with other portions so that storage for periods of time may be had for components that might be used which on comingling with other components might not be stored in a practical manner.

Catalyst 5 may be incorporated in the resin or it may be packaged in a separate envelope 4 made of a suitable plastic resin or other tight container, e.g. spaghetti-like in form, and completely sealed, but subject to osmotic action, or adapted for crushing or puncturing when properly impacted or otherwise handled, so as to release the catalyst 5 into the resin 21 when it is desired to polymerize or "cure" the resins 21. The catalyst 5 can be of a type that requires substantial heat to complete the reaction between resin 21 and catalyst 5 or the resins 21 can be of a type which sets at room temperature.

Among the various resins useful in this invention but without limitation the following types can be mentioned:
(1) Polyester resins
(2) Vinyl resins which includes resins made from resin derivatives of vinyl
(3) Indene resins
(4) Lignin plastic materials and substances
(5) Sulphonamide resins
(6) Phenol aldehyde resins
(7) Resins from sugar
(8) Alkyd resins
(9) Amino-aldehydic resins
(10) Polyester resins containing triallyl cyanurate (heat resistant)
(11) Polyester resins made from triallyl cyanurate and specially selected modified maleic alkyd
(12) Polyester resins containing fireproofing additives such as antimony oxide and Chlorowax 70
(13) Ethoxyline resins also known as epoxy resins
(14) Silicone resins
(15) Vinyl resins containing trinitrobenzene complex or containing zinc dimethyldithiocarbamate cyclohexylamine complex (rodent resistant properties)

The synthetic and natural latices also will provide usable materials and they include as herein mentioned for illustrative purposes, but not including all of the latices usable, illustrated as follows:

(1) Buna and Perbunan (polymerized or copolymerized butadiene)
(2) Pliofilm (rubber hydrochloride)
(3) Neoprene (polymerized chloroprene)
(4) Thiokol (polymethylene polysulphide)
(5) Tornsit (chlorinated rubber)
(6) Plioform (isomerized rubber)
(7) Any latex of the above
(8) Polyfilm (polyethylene)
(9) Styrene
(10) Nylon-fabric phenolic-resin resistant to micro-organisms such as *Aspergillus niger, Penicillium luteum, Rhizopus nigricians, Monilia,* and *Aspergillus amstelodann*

(11) Melamine-nylon resins and phenolic-nylon combinations suitable where high electrical insulation is important.

(12) Compatible combinations of thermosetting and thermoplastic resins

Since the flexible envelopes 3 and 4 can be made of plastic having substantial strengths in tension as described for the particular use, e.g., of the order of 28,000 p.s.i. or less, and also can be selected for other properties such as chemical and mechanical properties as uses require, a variety of materials are needed and are available for making envelopes 3 and 4.

Since many types and kinds of structural and decorative constructions having many types of specific properties can be made by this invention the resins available are many and varied, other resins and compatible combinations of resins are being constantly presented for use, and such materials and the like as are presented in the future will be used in the practice of this invention.

Fiberglass 2, for example, may have a strength of the order of 300,000 lbs. per square inch to 1,000,000 lbs. per square inch in tension as compared to common steel of the order of 60,000 lbs. per square inch and 24ST aluminum of the order of 60,000 lbs. per square inch ultimate strengths. The specific gravity of glass is 2.54 while that of steel is 7.8. The modulus of elasticity is about 10,500,000 p.s.i. Almost perfect elasticity is shown; rupture takes place at three percent elongation with almost no inelastic yield.

The use of fibrous strands of synthetic fiber or of fiberglass, the preferred fiber of this invention, provides a basically new feature to reinforcement of concrete or masonry construction.

The feature of 3% elongation with almost no inelastic yield as in the case of fiberglass (other characteristics and features of stress-strain prevailing in other fibrous materials) if maintained in a state of equality in a group of fibers and protected against adverse influences like abrasion, injurious chemicals, unequal loading of individual fibers or slivers of staple or fibers when thus grouped provide for this invention the feature of resilient resistance and yielding while resisting static and dynamic loadings that is most advantageously used. Strands 2 are protected against abrasion and wear by sheathing them in the plastic resins 21 thus lubricating them against wear and abrasive contacts. Orientation and agglomeration increases strength of the stranded mass in assembly when fixed by plastic resins 21.

By way of illustration, an envelope 3 of desired properties is made ready and strands 2 of a suitable amount and cross section are covered with resin. This resin may be liquid in various viscous states or may be a paste resin or even a powdered resin. The resin catalyst 5 may be liquid, paste type or solid particles of material and may be incorporated directly into the resin in intimate mixture or may be packaged in spaghetti-like containers 4. The whole assembly may be in a pliable state and plastic and can be wound in reels of suitable diameter for easy handling and so as not to fracture or damage the strands 2.

The envelope package can also be made by pulling strands 2 such as roving through suitable sizing means to provide desired amounts of tensile reinforcement oriented. The envelope is advantageously opened out flat and the fibrous resin, etc., in suitable order laid upon a one half section; subsequently the envelope can be closed and heat sealed for transport to the place of use.

Such envelope package can be made of great length and reeled, the reel being a complete package. As shown in Figure 7 the reel may also contain a suitable electrical current generating source 31, e.g., batteries or chemical means as desired and also a supply of additional bonding resin 32. As a further example, a belt-like construction comprising a given number of stranded cable-like fiberglass unidirectional strands of roving are provided being enclosed in a polyethylene tubular envelope so they can be handled without damage. Such a construction is shown in Figure 6 showing such cables as elements 2 comprised of strands of fiberglass roving. The required number of fiberglass stranded reinforcements is placed on a plastic resin sheet or film, e.g., polyethylene film and a mass of unsaturated polyester resin composition in a thickened state to prevent run-off is spread or applied onto and around and about the groups of fiberglass strands. The unsaturated polyester resin may contain a filler and a color and can contain a mixed in catalyst stable at room temperatures and stable for a known period of time as known in the art. This catalyst system will activate polymerization of the plastic resin composition, e.g., unsaturated polyester resin composition at e.g., 250° F. and cure the resin in a predetermined time, e.g., 2 minutes to 10 minutes, but not limited to said temperature or times, depending upon the system and amount used in any specific construction, and also depending upon the pressures if any, to which the lamination is subjected while under cure.

On arrival at the site of use the packaged reinforcement is unrolled and placed within a mold or upon a concrete construction and, according to one feature of the invention, anchorage provided if desired, and the reinforcing strands stretched against the concrete structure to effect prestressing.

If catalyst 5 is separated from the plastic resin 21 by containers 4, it is released into the resin by fracture, pressing or heating. The plastic layer is then cured, ordinarily by pressing and heating the mass to a predetermined temperature. The plastic enters into the concrete, making out of the plain concrete a denser, stronger reinforced concrete construction.

Depending upon the materials used for the envelope, bonded or non-bonded reinforcements can thus be had. Additional bonding plastics or plastic resins can be applied on the exterior of the reinforcing mass or the adjacent surface of the concrete when they are assembled. The resin penetrates adjacent pores of the concrete to give a very strong bond thereto and to the reinforcements. The envelope 3 can be made of plastics or materials that can be incorporated as a part of the reinforcement laminate or the envelope 3 can be of the peel-off type which is removed prior to the bonding or placing of the reinforcement.

The reel-unit may have as a component thereof as shown in Figures 1 and 2 a cable-like element which element may be comprised of a plastic envelope 3 which may be made by extrusion, and fine resistance wire 19 may be embedded in the plastic resin 21, being pulled into the body of the resin 21. The package of Figures 1 and 2 can be made by covering with the resin 21 these strands 2 and the spaghetti-like catalyst containers 4 and enveloping them in the envelope 3. The whole assembly, being pliable and plastic, is wound in reels of suitable diameter so as not to fracture or damage the strands 2.

The package can also be made by pulling strands 2, such as roving, through suitable sizing means in which the resistance wire 19 also is pulled and the spaghetti-like catalyst 5 in container 4 is also oriented and placed adjacent to the strands 2 and the whole assembly sprayed or dipped or coated with pliable plastic 3, e.g., a "Pliofilm," or polyethylene resin, type of cover, liquid plastic resins 21 then being introduced by pressure pumping or the like into the envelope 3. The factory process winds the thus packaged construction on a reel which may also contain a vessel having therein a bonding resin composition and means for catalyzing the said resin composition.

On arrival at the site of use the packaged reinforcement is unrolled from the reel and placed within or upon a porous structural body or a construction made of concrete or the like, and in embodiments of some of the constructions, anchorage provided as end restraints and prestressing of the strands is accomplished if desired.

When put in place, catalyst 5 is released into the plastic resin 21, the electrical resistance wire 19 connected into an energizing circuit and the heated wire allowed to heat the mass to a predetermined temperature and cure said mass in place as a reinforcement making out of the plain porous structural material or plain concrete a reinforced pre-stressed concrete construction.

Depending upon the flexible envelope materials used, bonded or non-bonded reinforcements can be had. If desired, additional bonding plastics or plastic resins as contained in container or vessel 32 shown in Figure 7 is applied on the exterior of the reinforcing mass such as additional resin 21 shown being spread on the reinforcements of the enveloped construction shown in Figure 8 wherein the roller device is the spreading means, said resin 21 being spread prior to covering with concrete elements 1 and bond to said concrete elements 1 being attained by penetrating the adjacent pores by the thermosetting plastic resins of the reinforcement.

Figure 3 shows a plurality of wires 19 and a flat type flexible plastic envelope enclosure 3 containing fiberglass mat 2 which is surrounded and permeated by plastic resin 21. The sealed edges 20 provide protection in handling, and the method of heat sealing the plastic resin envelope 3 also can be used intermittently along the construction to seal off desired lengths. Figure 3 also shows electrical circuit 19, 26, 27, 28 used in applying heat for polymerization and curing of the plastic resins.

The enveloped construction as exampled in Figure 3 is shown packaged on a reel-unit as shown in Figure 7 and as a component of said reel-unit.

Figure 4 is an enlarged partial cross sectional view of Figure 3 and shows flexible envelope 3 containing plastic resins 21, fibrous reinforcements 2, spaghetti-like envelope 4 containing catalyst 5, resistance wire 19 and peel-off type plastic resin envelope covering 22 which will be used when envelope 3 is made as a partially cured plastic resin envelope that is tacky and sticky and adhesive and that will readily bond to porous surfaces and other bondable surfaces.

Figure 5 further illustrates the cross sectional area of the envelope construction component of a reel-unit of the invention bonded to concrete 1 and particularly illustrates the use of an additional surface layer of adhesive plastic resin 23, which, before application to the concrete is protected by the peel-off cover 22 and as shown, has finger-like penetrations, permeations and also is bonded to the reinforcement. Fiber reinforcement can be used in the resin 23 that projects into the body of the porous structural material, e.g., concrete 1.

The peel-off type plastic resin 22 is shown partially pulled off with the laminate bonded to the concrete 1. The penetration and permeation of resin plastic 23 fixes the plastic resin 23 with finger-like tantacles 78 extending within the normal pores of the concrete 1, which tentacles are converted by the curing of the plastic resin composition at a predetermined temperature to a strong reinforcing structure. On completion of the cure the prestressed concrete body is completed. Plastic resin 23 acts in a similar manner to plastic resin 21 shown in Figure 8 but comes to the site of use as a component of the envelope package while plastic resin 21 is supplied as a component of the package embedding the fibrous reinforcement and also as an additional supply provided in container 32 in the reel. Plastic resin 21 and 23 may be the same resin composition or may be compatible resin compositions.

Catalyst 5 in container 4 may be carried on a resistance wire 19 as shown in the right hand feature of Figure 5 or it may be a crushable glass ampule packaged catalyst or one of several other catalyst means as disclosed in my Patent No. 2,671,158.

Figure 6 is another embodiment of the invention provided as an enveloped, packaged lamination of structural reinforcement advantageously brought to the site of use as a reel-unit having all the necessary materials in balanced design ready for use wherein the said Figure 6 shows an enlarged cross section of the construction of the reinforcement components. Said section shows fiberglass strands 2 enclosed in plastic resin envelope 3 permeated and impregnated with plastic resin 21, with spaghetti-like plastic envelope 4 containing catalyst 5 placed adjacent the fiberglass strands 2. The strands 2 are spaced and contained in the plastic resin envelope by heat sealing at 30. Resistance wire 19 is also adjacent to the fiberglass strands 2 and the whole assembly is covered by a layer of plastic resin 21 enclosed in plastic envelope 3.

The concrete is advantageously preheated, and the retained heat kept in the concrete used to assist in curing the plastic resins. Additional prestressed preload can be obtained by the heat placed in the concrete by the inducing of additional prestress when the concrete shrinks to room or ambient temperatures.

Figure 7 illustrates means for dispensing and making readily available for convenient use resin plastic fiberglass-reinforced laminations. Plastic envelopes 3, which may be in one length or subdivided in convenient lengths containing the assembly are coiled and wound onto reel 86 supported on frame 57. If the package is provided with electrical elements for hot molding on the job (see Patent No. 2,671,158), electrical means 31 may be provided within the body of the reel 86 to heat the plastic and cure the laminate. Wires are run from the connections of electrical means 31 to the heater wires 19 in the reeled package. An additional supply of bonding plastic may be supplied in the center of the reel contained in can 33. This may be used for penetrating and permeating the concrete surface at the site when laminate is fixed to the concrete body as reinforcement thereof, if the package does not provide the necessary resin for that purpose.

With the lamination of materials compounded and wound onto the reel and other components of the reel-unit provided, e.g., bonding resin in vessel 32 and source of electrical energy comprised of e.g., a battery, the reel-unit can be transported to a site of use, e.g., a bridge or building site where the reinforcement materials are placed and processed into final state of use, e.g., for end use as reinforcement to concrete or masonry bodies. The plastic resin or plastic resin compositions 21 and the fibrous materials are fixed, integrated and bonded to and with the porous structural material, e.g., concrete, by actuating the polymerization reaction of the said plastic resin composition or compositions of the packaged construction to a state of final cure and finish. In the combination of some embodiments of the invention it has been found that a sufficiency of plastic resin 21 is carried in and about the fibrous reinforcements or other type reinforcements to complete a satisfactory bonding of the said plastic resin 21 and its embedded reinforcement to and with the porous structure of the porous sturctural body component of the reinforced structure being made. The nature of the flow characteristics of the plastic resin composition and the nature of the pores and interstices and wetting characteristics of the concrete or other porous structural materials determine in some installations whether additional bonding resin 21 is required. At times environmental conditions such as ambient temperature or humidity affect the flow characteristics of certain of the plastic resins 21 useful in the invention so that additional plastic resin composition is required to that carried in the envelope package. This is provided in container 32.

The plastic resin used may be a two or more component system, one component being prepared for use on site and another being pre-impregnated into a fibrous mat or strands at the basic point of manufacture of the enveloped construction. As disclosed in the instant invention various plastic resins may be used such as unsaturated polyester resin compositions or phenolic resins or epoxy resins (also called ethoxyline resins) or silicone resins. As known in the art combinations of plastic resins such as e.g., phenolic or polyamides, or polymethylene polysulphide resins, but not limited to these resins or rubbers, may be combined with e.g., epoxy resins to make advantageous resin reinforcement constructions for embedding the fibrous strands or mats, e.g., fiberglass materials and thus make the laminations of reinforcement packaged into the envelopes 3 and wound on the reels of the invention.

The reel-unit comprising the invention provides materials in balanced designed constructions to be used without waste and pre-engineered and chemically compounded to insure a satisfactory resultant construction every time. The responsibility of accuracy and integrity of construction is assured by the packaging and factory preparing of the components of the invention because in the factory it is possible to afford the costs of skilled engineering and chemical personnel and means. Mass production techniques not practical at the site of use can be employed with greatly reduced cost possible. On site personnel as is usually found on building and engineering construction projects, or for that matter, as found in any average factory where the components are used can successfully make the end product sought because of the packaged compounded ready-for-use construction provided by the reel-unit of the invention.

The energy source can be one for several uses or it can be one adapted to a one time use with just enough energy available for the contents of one reel-unit. The energy source can be a disposable battery or a re-energizing type of battery like a car storage battery. The energy source may be a separate independent generator of electric energy. No limitation on source of heat energy is intended in this application as other means of providing heat energy can be and are used, e.g., chemical means.

The enveloped construction of the reel-unit may also be made in sections of definite lengths but joined together as by heat sealed means, each section having an independent circuit of heating wires 19. Another laminated construction can provide a continuous envelope 3 and a continuous fibrous unidirectional or other type reinforcement 2 with heating wires 19 also continuous parallel to the fibrous reinforcement and provided at the time of use with cross connecting wires to form independent circuits of any length desired when the longitudinal wires 19 are cut to desired lengths. Where conductive materials are integral particles included in the laminations of materials as e.g., formulated rubber compounds, the heat feature may be provided without wires 19.

Figure 8 illustrates a roller type spreader for the resin plastic mix. This spreader comprises a frame upright 36, an axle 37, a vessel 34, in which sufficient weight is placed to provide pressure for compacting the laminated body to the concrete. Handle frame 40 and handle 41 serve for propelling the roller. On the front a separate tang 35 is provided with disposable waxed paper or the like liners 87 containing resin plastic 21. The liners have one end which converges into a perforated slotted edge through which the resin plastic 21 is released onto the roller 38 for distribution as desired upon the laminating surface.

Figure 9 illustrates a number of concerete blocks 1 assembled together with plastic-resin and fiberglass joints 29, sealed and bonded together, and an exterior face covered with fiberglass decorative coatings of resin plastic, all of which reinforces and contains the concrete blocks 1, and which may be further strengthened and reinforced by additional laminated layers of plastic resin reinforced coated fiberglass forming the whole into a unitary structure for use as a plate girder, beam or the like.

The reel-unit shown in Figure 7 is set over a make-up table 88 upon which a platen surface 187 is a component and which may or may not have integral heating means adapted to provide additional heat over that provided by the heating wires 19, or if the construction being used does not have wiring of heating wires 19 included in the package, provide all the heat needed to cure the plastic resin compositions of the construction.

Plastic resin 21 or plastic resin 23 on the surface of the laminated reinforcement of component materials shown as 16b when bonded to the concrete 1 or other porous structural material shows the finger-like tentacles 78 which are more particularly shown in Figure 5. The device of Figure 8 is particularly adapted to the placing of plastic resin 21 in an even layer by means of the roller 37 fed through the slotted or otherwise opened feed of the plastic resin container waxed paper liner 87, or other liner or the like of suitable material.

The reel-unit may be made with the reinforcement component package comprising a laminated plastic-resin fiberglass reinforced tube made in the flat and inflatable into a vessel or tank or the like. The plastic envelope being made in two layers, or more than two layers as needed, between which is located fiberglass 2 impregnated and permeated by plastic resin 21. A pliable or crushable container or containers 4 containing catalyst 5 is adapted upon applied pressure or perforation to expel catalyst 5 into the resin plastic 21 to be dispersed and comingled therewith.

The reel-unit having a tubular construction made in the flat is a particularly useful embodiment of the invention that can be inflated by various means.

Figures 1 to 9 inclusive show illustrations of structural concept but are not limiting of such concept as obviously the constructions mentioned in the objects of this invention require many other structural designs and forms. Packaged reinforcement is applicable to use at the site of use for many building constructions, bridge constructions, engineering structural constructions, military and non-military protective constructions both as housing and as fortifications, piping and conduits and especially large sized conduits of the order of two feet in diameter to say twenty feet in diameter, tanks and vessels of many kinds and shapes, electrical constructions, piling docks and wharfage and wharfs subject to impact-impulse loadings, airfield slabs and constructions, and in fact all places where concrete is used in construction or where other suitable porous bodies are so used. The advantages of reinforcement fibers such as fiber glass in being placed in positions of required strength much more easily than other materials in achieving maximum efficiency of strength from orientation of the fibers provides structural design possibilities limited to only the sound engineering concepts and imagination of the designer. Further, with the many plastics that are available architectural, esthetic and decorative embodiments are available at one and the same time that reinforcement is accomplished and in part or in whole with the same materials. Also because of the characteristics of plastic resins many special surfaces and formulations can be made to meet exacting specific use conditions. Also characteristics of fibers and fillers provide novel and new possibilities for constructions.

The plastic resins that may be used are many and varied but certain characteristics such as waterproof qualities, acid and alkalie resistant qualities, elasticity, freedom from self generated internal strains that determine length of life or that deteriorate progressively, termite, insect, fungus, vermin and bacteria proof qualities, or decay brought on by bio-chemical means, maintaining integrity against deterioration by oxidation or light or other rays, free chemicals, gases and the like are desirable in part or in whole or in combination as required to complete designed needs of the constructions.

Of the plastic resin groups that could be used, some of these are as follows:

The vinyl derivatives and vinyl resins, the phenol formaldehyde tar acids and formaldehyde, furfuraldehyde phenol or other aldehydes, cresol and the like, urea and aniline formaldehyde resins, condensed aniline and formaldehyde and aldehydes. The alkyd resins in all forms compatible with urea, and resins developed from paratoluensulphonamide. Resin made from sugar and molasses, polyisobutadiene and related vinyl derivatives, polyester resins made by poly-esterifications of polybasic acids with polyhydric alcohols, polyisobutylene polymerized with boron trifluoride and also polyisobutadiene, indene resins, natural and synthetic plastic, cellulose and its derivatives and assorted products, protein plastics such as casein, polypentamethylene sebacamide (nylon) petroleum plastic derivatives, nitrogenous condensation products, resins having germ killing properties or that possess such properties for a limited time period all are desirable for specified uses when so designed. Polyester resins are easily handled without much equipment and provide one resin type considered practical and which with other resins in combination or alone can and will meet the needs of the constructions herein disclosed.

One important element is the shrinkage factor each resin or combination has since the forces developed by the shrinkage are put to work to prestress the constructions. The relationship to temperatures and changes thereof and particularly ambient temperature will partly determine selection of resins used for specific constructions.

Fibers selected are subject to stress analysis and each use dictates selection based on cost, availability and strength characteristics. Fiber glass, at present, is preferred as the highest strength economical material (300,000 p.s.i. ultimate in tension) with respect to tension loading. It has other definite advantages and characteristics inherent to its nature e.g., low stretch, about 3% before failure in ultimate loading, and when embedded in plastic resin compositions, e.g., unsaturated polyester resin compositions or epoxy resins of the invention, fiberglass has resiliency and higher stretch away from the contact face of the porous structural material to which the construction laminate is bonded.

Concrete is a variable material depended upon almost universally. There are many aggregate sources by which the engineer can construct good concrete qualities. With care and present know how 10,000 p.s.i. (in compression) concrete is commercially available.

The combinations of the materials herein disclosed and the resulting constructions will provide for field use, strong reinforcing made of non-metallic materials capable of being used alone or in combination with metallic known materials.

The reel-unit is comprised of several components all cooperative one with the other as a designed construction. The reel-unit is made of known materials, e.g., metal, wood, paper, plastics, etc., and is provided with a means for containing plastic resins or the like, packaged as a component of the resultant product made from the present invention. The enveloped laminated construction of plastic resin composition and fibrous reinforcement may have also in its construction heating means, e.g., heating wires 19 or other processing means. The reel-unit delivered to the place of use provides at once the materials and the processing means for bonding, integrating, and laminating to porous structural bodies, e.g., concrete bodies.

It is to be recognized that although some of the embodiments and examples herein are substantially identical with those given in companion cases covering related but distinct inventions, it will be understood by those versed in patent law and practice that this is because these practical articles and methods embody several inventions, each or some of which can be used with or without the others, i.e., some of the inventions thus used together may be considered optional or can be replaced by alternatives.

The examples and alternatives given should not be regarded as exhaustive or limiting of the invention but, on the contrary are given for the purpose of instructing others in the best manner of using and applying the invention and so far as to explain and illustrate the principles whereof that others will be enabled to use the invention in many modifications and various embodiments, each as may be best adapted to the requirements of a particular use.

The foregoing description of the invention is for the purpose of illustration only. There is no intention of limiting the scope of the invention which is set forth in the specification and the claims, wherein I claim:

1. A reel-unit for packaging, transporting and processing an envelope construction containing reinforcing materials adapted to provide load-bearing reinforcement to at least one porous structural body, comprising an axially mounted reel with storage means in at least a portion of said reel, said storage means containing an unpolymerized plastic resin composition, said storage means having means to emit when opened the said unpolymerized plastic resin composition which comprises the plastic resin composition used for bonding the reinforcing materials provided in said envelope construction of said reel-unit to and with at least one porous structural body.

2. A reel-unit as in claim 1 having a vessel with an operative valved inlet and outlet comprising said storage means for containing unpolymerized plastic resin composition and a separate packaged catalyst therefor as a component for said unpolymerized plastic resin composition in ready-for-use state for catalyzing said unpolymerized plastic resin composition to a polymerizable plastic resin composition in said vessel, said vessel having an outlet adapted to emit a flow of polymerizable plastic resin composition onto the said reinforcing materials of said envelope construction.

3. A reel-unit as in claim 1 having a mounting frame making unreeling from said reel-unit easily accomplished and making said reel-unit readily transportable.

4. A reel-unit as in claim 1 having in addition, an electric energy source connected to at least one electric resistance heating element contained in said envelope construction, said energy source being adapted to heat said heating element for the assisting in the polymerization of a plastic resin composition component of said envelope construction.

5. A reel-unit as in claim 1 in which said storage means comprises a vessel which is a part of the core of said reel-unit upon which said envelope construction is wound.

6. The method of making a composite structural member from at least a portion of the materials provided in a reel-unit and bonded to a porous structural material wherein the said porous structural material is first covered with a layer of bonding resin, a package comprising an envelope being provided with a core of heating elements, unpolymerized plastic resin, and a fibrous reinforcement is unrolled from a reel having a battery therein and which battery is connected through an open circuit to the heating elements, pressing and rupturing the envelope, then closing the circuit between the battery and heating elements with the heat therefrom polymerizing the plastic resin into a rigid state about the fibrous reinforcement and as a layer on the surface and into the pores of the said porous structural material.

7. The method of making a composite structural member formed in place from at least a portion of the materials provided in a reel-unit having a package comprising an envelope thereof containing plastic resin and a porous structural material as in claim 6 in which upon the application of heat the said plastic resin in the package becomes flowable and penetrates and permeates the fibrous reinforcement of the said package.

8. The method of making a composite structural member formed in place from at least a portion of the materials provided in a reel-unit and a porous structural material as in claim 6 in which the envelope package film enclosure defining the envelope softens and combines with the said plastic resin upon the application of heat.

9. The method of making a composite structural member formed in place from at least a portion of the materials provided in a reel-unit and a porous structural material as in claim 6 in which the resistance circuit of the heating elements in the said envelope is energized to provide a predetermined temperature for a predetermined time.

10. The method of making a composite structural member from at least a portion of the materials provided in a reel-unit and a porous structural material as in claim 6 in which the plastic resin composition is an ethylenically unsaturated dicarboxylic acid and a glycol forming a thermosetting cross-linked polymerizable product when combined with a benzoyl peroxide catalyst and a styrene monomer; said combination occuring in the processing means provided in and of the packaged construction as it is unrolled from said reel-unit by the opening of components of the packaged construction as it is used.

11. The method of making a composite structural member from at least a portion of the materials provided in a reel-unit and a porous structural material as in claim 6 in which the said plastic resin is a two component system of epoxy resin and a curing agent therefor each separately packaged in the said envelope package and combined at the time of use as the envelope package is unrolled, opened and combined with the said porous structural material.

12. The method of making a composite structural member from at least a portion of the materials provided in a reel-unit and a porous structural material as in claim 6 in which the said plastic resin upon the application of heat becomes flowable and is present in the said fibrous reinforcement in an amount in excess of the quantity needed to saturate the said fibrous reinforcement; said excess of flowable plastic resin adapted to enter the pores and interstices of the said porous structural material in its flowable state and upon polymerization and curing, interlock and bond the said surface layer construction from which it comes, into a unitary strong reinforced composite structural member, said reel-unit having a component providing the amount of heat needed to cause said plastic resin to become flowable.

13. The method of making a composite structural member from at least a portion of the materials provided in a reel-unit and a porous structural material as in claim 6 in which the said plastic resin is polymerized as used without application of external heat upon the placement of the said enveloped packaged construction in unrolling from the said reel-body.

14. The method of making a composite structural member from at least a portion of the materials provided in a reel-unit and a porous structural material as in claim 6 in which the fibrous reinforcement is comprised of combinations of fiberglass and fuzed quartz fibers in predetermined resilient resistant dynamic load-bearing constructions when bonded in the lamination to and with the porous structural material.

15. The method of making a composite structural member from at least a portion of the materials provided in a reel-unit and a porous structural body as in claim 6 in which the materials comprising the package are waterproof, gas tight and sealed.

16. The method of making a composite structural member from at least a portion of the materials provided in a reel-unit and a porous structural body as in claim 6 in which the package is compartmentized having packaged materials in said compartments adapted to comingling for the polymerization thereof as the package is unrolled from the reel-body of the reel-unit.

17. The method of making a composite structural member from at least a portion of the materials provided in a reel-unit and a porous structural material as in claim 6 in which a solvent is applied to the envelope of the package as it is unrolled from the reel-body causing materials of the package to become adhesive and sticky and fixing the envelope in place upon at least one masonry porous structure of the porous structural material into a lamination thereof and thereon, said solvent contained in a packaged compartment of said reel-unit.

18. The method of making a composite structural member from at least a portion of the materials provided in a reel-unit and a porous structural material as in claim 6 in which said envelope contains preimpregnated plastic resin-fibrous material adapted to the reinforcement of said porous structural material.

19. The method of making a composite structural member from at least a portion of the materials provided in a reel-unit and a porous structural body comprising the providing of a discrete advantageously manufactured reel-body, providing an enveloped packaged plastic resin fibrous reinforcement comprised of a mass of unsaturated polyester resin and styrene monomer in discrete combination, said resin and monomer containing a benzoyl peroxide catalyst, color, filler and stabilizer surrounding said fibrous reinforcement comprised of unidirectional strands of oriented fiberglass in combination with multidirectional strands of fiberglass in mat form, said reinforcement in discrete amounts in balanced structural design, providing an envelope of resin film to form a package enclosing said materials, filling and placing the resultant envelope package upon the reel-body, filling and placing a vessel of bonding resin into the reel-body, installing an electrical element adapted to provide resistance heating on demand, shipping and transporting the reel-unit to the site of use, opening said vessel containing said bonding resin and placing a discrete amount of said bonding resin on said porous structural material of said porous structural body, combining said reel-unit materials of lamination to and with said porous structural body at site of use and actuating the electric element to provide heat for use in assisting the polymerizing and curing the enveloped packaged materials when opened and removed from the reel-body and placed in combination with said porous structural body thus making said combination of materials into a unitary composite structural member and disposing of said reel-body.

20. The method of making a composite structural member from at least a portion of the materials provided in a reel-unit having a packaged, enveloped fibrous reinforcement and packaged unpolymerized bonding resin composition having a predetermined shrinkage when polymerized on, into and with a porous structural material comprising the steps wherein the porous structural material is first covered with a layer of said unpolymerized bonding resin, and second, an envelope being provided with a core of heating elements, unpolymerized plastic resin, and a fiberglass reinforcement is unrolled from a reel having a battery therein and which battery is connected through an open circuit to the heating elements, and third, pressing and rupturing the envelope, then, fourth, closing the circuit between the battery and the heating elements with heat therefrom polymerizing the plastic resin composition into a rigid state about the fibrous reinforcement and as a layer on the surface and in the pores of the structural materials, the said plastic resin composition during the polymerization reaction, providing induced shrinkage forces into the said plastic resin composition and fibrous material fiberglass and into the porous structural material providing thereby a predetermined internal stress of substantial amount by complex stresses induced by shrinkage in the plastic resin composition transmitted through the interface bond area as compressive stress in the bonded materials of said composite structural member.

References Cited in the file of this patent
UNITED STATES PATENTS

| | | |
|---|---|---|
| 842,477 | Lodor | Jan. 29, 1907 |
| 1,275,449 | Lemon | Aug. 13, 1918 |
| 1,625,585 | Archer | Apr. 19, 1927 |
| 1,832,446 | Boe | Nov. 17, 1931 |
| 1,836,815 | Reeves | Dec. 15, 1931 |
| 1,852,451 | Everett | Apr. 5, 1932 |
| 1,955,872 | Cosgrove | Apr. 24, 1934 |
| 2,044,382 | Dunagan | June 16, 1936 |
| 2,102,447 | Whitacre | Dec. 14, 1937 |
| 2,184,137 | Brewer | Dec. 19, 1939 |
| 2,348,477 | Jenking | May 9, 1944 |
| 2,470,009 | Wilhelm | May 10, 1949 |
| 2,537,918 | Skoog | Jan. 9, 1951 |
| 2,647,554 | Grieshammer | Aug. 4, 1953 |
| 2,671,158 | Rubenstein | Mar. 2, 1954 |
| 2,693,918 | Bretson et al. | Nov. 9, 1954 |